United States Patent (10) Patent No.: US 12,421,354 B2
Jeletic et al. (45) Date of Patent: Sep. 23, 2025

(54) METHODS FOR THE PREPARATION AND USE OF SILYL ESTER COMPOUNDS

(71) Applicants: Dow Silicones Corporation, Midland, MI (US); Dow Global Technologies LLC, Midland, MI (US)

(72) Inventors: Matthew Jeletic, Midland, MI (US); Donald V. Eldred, Midland, MI (US); Michael Telgenhoff, Midland, MI (US)

(73) Assignees: Dow Global Technologies LLC, Midland, MI (US); Dow Silicones Corporation, Midland, MI (US)

( * ) Notice: Subject to any disclaimer, the term of this patent is extended or adjusted under 35 U.S.C. 154(b) by 438 days.

(21) Appl. No.: 18/001,488

(22) PCT Filed: Aug. 25, 2021

(86) PCT No.: PCT/US2021/047431
§ 371 (c)(1),
(2) Date: Dec. 12, 2022

(87) PCT Pub. No.: WO2022/066342
PCT Pub. Date: Mar. 31, 2022

(65) Prior Publication Data
US 2023/0295379 A1  Sep. 21, 2023

Related U.S. Application Data

(60) Provisional application No. 63/082,485, filed on Sep. 24, 2020.

(51) Int. Cl.
*C08G 77/38* (2006.01)
*C08G 77/08* (2006.01)
*C08G 77/20* (2006.01)

(52) U.S. Cl.
CPC ............. *C08G 77/38* (2013.01); *C08G 77/08* (2013.01); *C08G 77/20* (2013.01)

(58) Field of Classification Search
CPC ......... C08G 77/08; C08G 77/20; C08G 77/38
See application file for complete search history.

(56) References Cited

U.S. PATENT DOCUMENTS

| | | | |
|---|---|---|---|
| 3,159,601 A | 12/1964 | Ashby et al. | |
| 3,220,972 A | 11/1965 | Lamoreaux et al. | |
| 3,296,291 A | 1/1967 | Scotia et al. | |
| 3,419,593 A | 12/1968 | Willing et al. | |
| 3,516,946 A | 6/1970 | Scotia et al. | |
| 3,814,730 A | 6/1974 | Karstedt et al. | |
| 3,989,668 A | 11/1976 | Lee et al. | |
| 4,370,358 A | 1/1983 | Hayes et al. | |
| 4,665,147 A * | 5/1987 | Lien | C07F 7/0838 556/440 |
| 4,707,531 A | 11/1987 | Shirahata | |
| 4,746,750 A * | 5/1988 | Revis | C07F 7/0838 556/443 |
| 4,766,176 A | 8/1988 | Lee et al. | |
| 4,784,879 A | 11/1988 | Lee et al. | |
| 5,017,654 A | 5/1991 | Togashi et al. | |
| 5,036,117 A | 7/1991 | Chung et al. | |
| 5,091,555 A * | 2/1992 | Buder | C07C 255/16 558/451 |
| 5,175,325 A | 12/1992 | Brown et al. | |
| 5,310,843 A | 5/1994 | Morita | |
| 7,307,178 B2 | 12/2007 | Kiyomori et al. | |
| 2015/0376488 A1* | 12/2015 | Tan | C08L 83/14 252/78.3 |

FOREIGN PATENT DOCUMENTS

| | | |
|---|---|---|
| EP | 0347895 | 11/1993 |
| JP | 2011213868 | 10/2011 |
| PL | 217838 B1 * | 8/2014 |

OTHER PUBLICATIONS

Andrianov, "Synthesis of dimethylsiloxane series oligomers with terminal hydridosilyl and carboxyl groups", 1971, vol. 41, pp. 606-609.
Andrianov, Zhurnal Obshchei Khimii, 1973, vol. 43, pp. 1505-1507.
Chauhan, "An efficient Pd-catalyzed route to silyl esters", Organic Letters, 2000, vol. 2, No. 8, pp. 1027-1029.
Liu, "Preparation of silyl esters by ZnCl2?catalysed cross?coupling of carboxylic acids and silanes", Synlett, 2006, pp. 1431-1433.
Liu, "Two New Catalysts for the Dehydrogenative Coupling Reaction of Carboxylic Acids with Silanes-Convenient Methods for an Atom?Economical Preparation of Silyl Esters", Synthetic Communications, 2007, vol. 37, pp. 2717-2727.
Ojima, "An Efficient Solvent-Free Route to Silyl Esters and Silyl Ethers", Advanced synthesis and catalysis, 2009, vol. 351, pp. 1405-1411.
Schubert, "Conversion of hydrosilanes to silanols and silyl esters catalyzed by [PPh3CuH]6.", Inorganic Chemistry, 1997, vol. 36, pp. 1258-1259.

* cited by examiner

*Primary Examiner* — Marc S Zimmer
(74) *Attorney, Agent, or Firm* — Catherine U. Brown

(57) ABSTRACT

A method for preparing a silyl ester compound is disclosed. The silyl ester compound may be a silane monomer or siloxane oligomer. The silyl ester compound may be hydro silylated with a polyorganohydrogensiloxane to form a silyl ester protected product, which may then be de-protected with water to prepare a carboxy-functional polyorganosiloxane.

10 Claims, No Drawings

METHODS FOR THE PREPARATION AND USE OF SILYL ESTER COMPOUNDS

CROSS REFERENCE TO RELATED APPLICATIONS

This application is a U.S. national stage filing under 35 U.S.C. § 371 of PCT Application No. PCT/US2021/047431 filed on 25 Aug. 2021, currently pending. which claims the benefit of U.S. Provisional Patent Application No. 63/082,485 filed 24 Sep. 2020 under 35 U.S.C. § 119 (e). PCT Application No. PCT/US2021/047431 and U.S. Provisional Patent Application No. 63/082,485 are each hereby incorporated by reference.

TECHNICAL FIELD

An efficient method for preparing a silyl ester compound via hydrosilylation of a silyl hydride and an allyl (alkyl) acrylate with <1% Si—C by-products is disclosed. The silyl ester compound may be a silane monomer or a siloxane oligomer. The silyl ester compound may be used in a method for preparing carboxy-functional organosilicon compounds such as carboxy-functional polyorganosiloxanes.

BACKGROUND

Carboxylic acid functional siloxanes are excellent rheology and wetting modifiers for polyesters. When reacted with inorganic bases or amines, they perform as anti-static surfactants and lubricants. Existing methods for preparing carboxylic acid functional (carboxy-functional) polyorganosiloxanes include transesterification processes, however, they may require multiple steps with purification (e.g., distillation and/or extraction) and separate unit operations, which can be time consuming and costly.

SUMMARY

A method for preparing a silyl ester compound is provided. The method comprises: 1) combining starting materials comprising (A) a silyl hydride, (B) an allyl (alkyl) acrylate, and (C) a rhodium catalyst, thereby producing (D) the silyl ester compound. The method may further comprise: 2) combining starting materials comprising (D) the silyl ester compound, and (E) an organosilicon compound having at least one silicon bonded hydrogen atom per molecule; thereby forming (G) a silyl ester protected product. The method may further comprise: 3) combining starting materials comprising (G) the silyl ester protected product and (H) water, thereby forming a carboxy-functional organosilicon compound.

DETAILED DESCRIPTION

In the method described above, step 1) comprises combining starting materials comprising (A) the silyl hydride, (B) the allyl (alkyl)acrylate; and (C) the rhodium catalyst; thereby producing (D) the silyl ester compound. Alternatively, the starting materials used in step 1) may consist essentially of (A), (B), and (C). Alternatively, the starting materials used in step 1) may consist of (A), (B), and (C). Optionally, a solvent may be added to facilitate addition of (C) the rhodium catalyst. Optionally, a (meth)acrylate polymerization inhibitor may be added during step 1).

The starting materials used in step 1) may be combined by any convenient means such as mixing. Starting materials comprising (A) the silyl hydride, may be metered into a reactor containing starting materials comprising (B) the allyl (meth)acrylate and (C) the rhodium catalyst. The starting materials in the reactor may further comprise the solvent and/or the polymerization inhibitor, described above. The starting materials in step 1) may be heated at a temperature of at least 50° C., alternatively at least 60° C. At the same time, the starting materials in step 1) may be heated at a temperature of up to 125° C., alternatively up to 80° C., alternatively up to 75° C., alternatively up to 70° C., and alternatively up to 60° C. Without wishing to be bound by theory, it is thought that lower temperatures, e.g., 50° C. to 60° C. may be desirable to minimize propene hydrogenation. Step 1) may be performed in a batch or semi-batch mode. Step 1) may be performed under an inert atmosphere, e.g., nitrogen. Without wishing to be bound by theory, it is thought that using an agitated batch reactor with an inert gas sweep through the reaction mixture therein may improve yield by removing by-product propene before it can react. The starting materials used in the method are described in detail, as follows.

(A) Silyl Hydride

Starting material (A) used in step 1) of the method described herein is a silyl hydride. The silyl hydride has one silicon bonded hydrogen atom per molecule. The silyl hydride may be a silane monomer and/or a siloxane oligomer. For example, the siloxane oligomer for may comprise an organohydrogensiloxane oligomer of unit formula (A1): $(R^1_3SiO_{1/2})_a(R^1_2HSiO_{1/2})_b(R^1_2SiO_{2/2})_c(R^1HSiO_{2/2})_d$, where each $R^1$ is independently selected from the group consisting of an alkyl group of 1 to 8 carbon atoms and a halogenated alkyl group of 1 to 8 carbon atoms, subscript a is 0 to 2, subscript b is 0 to 2, and a quantity (a+b)=2; subscript c is 0 or 1, subscript d is 0 or 1; a quantity (b+d)=1; and $4 \geq (a+b+c+d) \geq 2$. Alternatively, $3 \geq (a+b+c+d) \geq 2$.

Suitable alkyl groups for $R^1$ are exemplified by, but not limited to, methyl, ethyl, propyl (e.g., iso-propyl and/or n-propyl), butyl (e.g., isobutyl, n-butyl, tert-butyl, and/or sec-butyl), pentyl (e.g., isopentyl, neopentyl, and/or tert-pentyl), hexyl, as well as branched saturated hydrocarbon groups of 6 carbon atoms. Suitable halogenated alkyl groups for $R^1$ are exemplified by, but not limited to, the alkyl groups described above where one or more hydrogen atoms is replaced with a halogen atom, such as F or Cl. For example, fluoromethyl; 2-fluoropropyl; 3,3,3-trifluoropropyl; 4,4,4-trifluorobutyl; 4,4,4,3,3-pentafluorobutyl; 5,5,5,4,4,3,3-heptafluoropentyl; 6,6,6,5,5,4,4,3,3-nonafluorohexyl; 2,2-difluorocyclopropyl; 2,3-difluorocyclobutyl; 3,4-difluorocyclohexyl; chloromethyl; chloropropyl; 2-dichlorocyclopropyl; and 2,3-dichlorocyclopentyl are examples of suitable halogenated alkyl groups. Alternatively, each $R^1$ is independently methyl, ethyl or propyl. Each instance of $R^1$ may be the same or different. Alternatively, each $R^1$ may be a methyl group.

Alternatively, starting material (A) may be selected from the group consisting of:

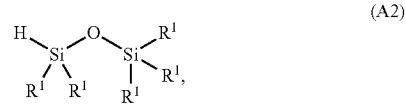
(A2)

-continued

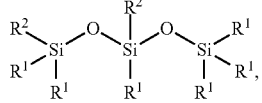
(A3)

and a combination of both (A2) and (A3); where $R^1$ is as described above, and $R^2$ is selected from the group consisting of H and $R^1$, with the proviso that one $R^2$ per molecule is H and one $R^2$ per molecule is $R^1$.

Alternatively, starting material (A) may be an organohydrogensiloxane oligomer of formula (A4):

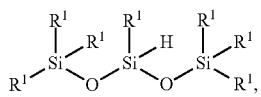

where $R^1$ is as described above.

Suitable organohydrogensiloxane oligomers for starting material (A) are known in the art and are commercially available. For example, suitable organohydrogensiloxane oligomers for starting material (A) may be selected from the group consisting of 1,1,1,3,5,5,5-heptamethyltrisiloxane; 1,1,3,3,3-pentamethyldisiloxane; and a combination thereof, and these oligomers are available from, e.g., Sigma-Aldrich, Inc. of St. Louis, Missouri, USA (Sigma).

Alternatively, starting material (A), the silyl hydride, used in the method described herein may comprise a silane monomer in addition to, or instead of, the siloxane oligomer described above. The silane monomer may have formula (A5): $HSiR^1_3$, where $R^1$ is as described above. Suitable silane monomers for starting material (A) are known in the art and are commercially available, e.g., from Gelest Inc. of Morrisville, Pennsylvania, USA. For example, the silane monomer for starting material (A) may be selected from the group consisting of trimethylsilane ($HSiMe_3$), triethylsilane ($HSiEt_3$), tripropylsilane ($HSiPr_3$), tributylsilane ($HSiBu_3$), trihexysilane, trioctylsilane, and a combination thereof.

(B) Allyl (alkyl)acrylate

Starting material (B) useful in the method described herein is an allyl (alkyl)acrylate. Starting material (B) has formula (B1)

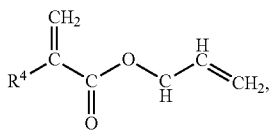

where $R^4$ is selected from the group consisting of hydrogen and an alkyl group of 1 to 8 carbon atoms (e.g., an alkyl group as described above for $R^1$). Alternatively, the alkyl group for $R^4$ may be a methyl group. Examples of starting material (B) include allyl acrylate and allyl methacrylate. Alternatively, starting material (B) may be allyl methacrylate.

Starting material (A), the silyl hydride, and starting material (B), the allyl (alkyl)acrylate, are used in step 1) of the method in relative molar amounts of starting material (B): starting material (A) greater than or equal to 1, i.e., molar ratio of (B):(A)≥1:1. Alternatively, (B):(A) may range from 5:1 to 1:1, alternatively 2:1 to 1:1; alternatively 1.5:1 to 1:1, and alternatively 1.1:1 to 1:1.

(C) Rhodium Catalyst

Starting material (C) in the method described herein is a rhodium catalyst. The rhodium catalyst may be used in an amount of at least 0.0000001 mol %, based on the amount of starting material (A), the silyl hydride, used in step 1) of the method described herein. Alternatively, the amount of rhodium catalyst may be at least 0.0001 mol % of rhodium catalyst, alternatively at least 0.001 mol %, alternatively at least 0.001 mol %, alternatively at least 0.01 mol %, and alternatively at least 0.1 mol % of rhodium catalyst, on the same basis. At the same time, the rhodium catalyst may be used in an amount of up to 100 mol % of rhodium catalyst, alternatively up to 10 mol %, alternatively up to 5 mol %, alternatively up to 2 mol %, alternatively up to 1 mol %, alternatively up to 0.1 mol %, and alternatively up to 0.01 mol %, on the same basis.

The rhodium catalyst (C) may be cationically charged or neutral. The rhodium may have a charge state (z) of 0, 1, 2, 3, 4, 5, 6. Alternatively, 0, 1, 2, 3; alternatively 0, 1, 3. The rhodium may be stabilized by 0-6 ligands. The rhodium catalyst may be monomeric, dimeric, trimeric, oligomeric, clustered, colloidal, nanoparticles or on a support such as alumina or carbon. The rhodium catalyst may comprise a rhodium-ligand complex. The rhodium-ligand complex may have formula (C1): $[Rh^z(R^3)_x]_y$, where subscript y is 1 to 100, subscript x is 0 to 6, and $R^3$ is a ligand. $R^3$ may be monodentate, chelating or bridging. $R^3$ may be a halogen such as F, Cl, Br, I; an alkyl group; 1,5-cyclooctadiene (COD); bicyclo[2.2.1]hept-2-ene; 2,5-norbornadiene (i.e., bicyclo[2.2.1]hepta-2,5-diene); 1,3,7-cyclooctatriene; 1,3,5, 7-cyclooctatetrene; allyl; nitrates, ammonium or ammonia; oxide; dihydrogen monoxide; trifluorosulfonic acid; benzene; dimethylformamide; dimethylsulfoxide; dialkyl or cyclic ethers; acetonitrile; ethylene, carbon monoxide, trisubstituted (aryl or alkyl) phosphines; disubstituted(alkyl, aryl or cyclic)phosphinoalkanes; dialkylaminoalkanes or diphenylaminoalkanes; trisubstituted amines (alkyl, phenyl) or cyclic amines; acetylacetonate (acac); dinitrogen; 1,3-Bis (dialkyl or diphenyl)imidazol-2-ylidene, 1,3-Bis(dialkyl or diphenyl)imidazolin-2-ylidene or 1,3-Bis(dialkyl or diphenyl)benzimidazol-2-ylidene NHC. Alternatively, $R^3$ may be a multidentate ligand that may combine one or more groups described above. Alternatively, $R^3$ may be the same or different or a combination of selected ligands above linked by a divalent group, such as a group of formula $—(CH_2)_x$, where x is as described above Alternatively, the rhodium-ligand complex may be, for example, a rhodium diphosphine complex, a rhodium cyclic diene complex, or a combination thereof. Without wishing to be bound by theory, it is thought all of the above Rh-ligand combinations may transform into a common active catalyst where the ligands may or may not be present and impart no selectivity benefit for the silyl ester (D) versus the Si—C hydrosilylation product.

Alternatively, starting material (C) added during step 1) may comprise a chelated rhodium diphosphine complex. The chelated rhodium diphosphine complex may have formula (C2): $\{[(R^8_2P)R^7(R^8_2P)]Rh(u-R^9)\}_2$. In formula (C2), each $R^7$ is independently a divalent hydrocarbon group, each $R^8$ is independently a monovalent hydrocarbon group, and each $R^9$ is independently a negatively charged ligand. The divalent hydrocarbon group for $R^7$ may be an alkane-diyl, such as an alkane-diyl group of 1 to 6 carbon atoms.

Alternatively, R⁷ may be methane-diyl, ethane-1,2-diyl, or hexane-1,6-diyl; and alternatively R⁷ may be ethane-1,2-diyl.

The monovalent hydrocarbon group for R⁸ may be an alkyl group or an aryl group. Alternatively, both instances of R⁸ may join together to form a heterocyclic group including the P atom in the ring. Suitable alkyl groups for R⁸ are exemplified by, but not limited to, methyl, ethyl, propyl (e.g., iso-propyl and/or n-propyl), butyl (e.g., isobutyl, n-butyl, tert-butyl, and/or sec-butyl), pentyl (e.g., isopentyl, neopentyl, and/or tert-pentyl), hexyl, as well as branched saturated hydrocarbon groups of 6 carbon atoms. Alternatively, the alkyl group for R⁸ may be methyl, ethyl or propyl. Suitable aryl groups for R⁸ are exemplified by, but not limited to, phenyl, tolyl, xylyl, benzyl, and 2-phenylethyl. Alternatively, R⁸ may be an ethyl group or a phenyl group.

Examples of negatively charged bridging ligand suitable for R⁹ include a halogen atom, an alkoxy ligand, and a hydride ligand. Examples of suitable halogen atoms include bromine (Br), chlorine (Cl) and iodine (I). Alternatively, the halogen atom may be Cl. Examples of alkoxy ligands include methoxy, ethoxy, and propoxy. Alternatively, the alkoxy ligand may be methoxy.

Examples suitable rhodium diphosphine complexes for starting material (C) include, but are not limited to [1,2-bis(diphenylphosphino)ethane]dichlorodirhodium; [1,2-bis(diethylphospino)ethane]dichlorodirhodium; and mixtures thereof. Rhodium diphosphine complexes are commercially available from Strem Chemicals, Inc. of Newburyport, Massachusetts, USA.

Alternatively, starting material (C) may comprise a rhodium catalyst without phosphine ligands. For example, starting material (C) may have formula (C3): $[R^5_h Rh]R^{10}$, (C4): $[Rh(R^5)_h(u-R^9)_f]_g$, or (C5) a combination of both (C3) and (C4), where subscript h is 1-4, each R⁵ is independently selected from the group consisting of a 1,5-cyclooctadiene ligand, a 2,5-norbornadiene ligand, an ethylene ligand, a cyclooctene ligand, and an acetylacetonate ligand; R¹⁰ is an anion; R⁹ is a negatively charged bridging ligand as described above; subscript f is 1 or 2, and subscript g is 1 or 2. Alternatively, R¹⁰, the anion may be what is referred to by those skilled in the art as a 'weakly coordinating anion' or a 'non-coordinating anion', including, but not limited to, perchlorate, trifluoromethylsulfonate, tetrafluoroborate, tetrakisphenylborate, tetrakis(pentafluorophenyl)borate, methyltris(pentafluorophenyl)borate, tetrakis(3,5-bis(trifluoromethyl)phenyl)borate, hexafluoroantimonate, hexafluorophosphate, $[Al(C(CF_3)_3)_4]^-$, carboranes such as $[HCB_{11}MesBr_6]^-$. For example, starting material (C) may comprise rhodium 1,5-cyclooctadiene chloride dimer, which is commercially available from Sigma-Aldrich, Inc.

The rhodium catalyst may optionally be delivered in a solvent. The solvent may solubilize the catalyst, but essentially does not react with the starting materials in step 1). The solvent may be selected based on solubility of the catalyst and volatility of the solvent and starting materials selected for use in step 1). The solubility refers to the solvent being sufficient to dissolve and/or disperse the catalyst. Volatility refers to vapor pressure of the solvent. If the solvent is too volatile (having too high vapor pressure), it may not facilitate mixing of (C) the rhodium catalyst sufficiently with starting material (A) and/or starting material (B). However, if the solvent is not volatile enough (too low vapor pressure) the solvent may be difficult to remove after completion of the method.

Suitable solvents include polyorganosiloxanes with suitable vapor pressures, such as hexamethyldisiloxane, octamethyltrisiloxane, hexamethylcyclotrisiloxane and other low molecular weight polyorganosiloxanes, such as 0.5 to 1.5 cSt DOWSIL™ 200 Fluids and DOWSIL™ OS FLUIDS, which are commercially available from Dow Silicones Corporation of Midland, Michigan, U.S.A. Alternatively, the solvent may comprise an organic solvent. The organic solvent can be an aromatic hydrocarbon such as benzene, toluene, or xylene; an aliphatic hydrocarbon such as heptane, hexane, or octane; a halogenated hydrocarbon such as chloroform, 1,1,1-trichloroethane or methylene chloride; an alcohol such as methanol or ethanol; a linear or cyclic ether such as diethyl ether, 1,4-dioxane, tetrahydropyran or tetrahydrofuran; or a combination of two or more thereof. The amount of solvent, when used, is not critical and may be up to 0.5% based on weight of starting materials (A), (B), and (C) described above.

The starting materials used in step 1) may optionally further comprise a (meth)acrylate polymerization inhibitor. Without wishing to be bound by theory, it is thought that the (alkyl)acrylate moiety in starting material (B) may polymerize under the conditions employed in step 1). To minimize or eliminate undesirable polymerization of the (alkyl)acrylate moiety, a polymerization inhibitor may be employed in step 1). For example, starting material (B), the allyl (alkyl) acrylate, may be combined with the polymerization inhibitor before or during step 1). The polymerization inhibitor may be a conventional (meth)acrylate polymerization inhibitor, for example, hydroquinone (HQ), methyl ether of hydroquinone (MEHQ), a sterically hindered hydrophenol such as 2,6-di-tert-butyl-4-methylphenol (also known as butylated hydroxytoluene, BHT), and/or a sterically hindered quinone such as di-tert-butylhydroquinone. Such polymerization inhibitors are known in the art and are commercially available. The amount of polymerization inhibitor depends on various factors including the amount of rhodium catalyst and temperature selected for step 1), however, the amount may be 0.0001:1 to 0.1:1 weight parts of inhibitor: weight parts of starting material (B).

The inventors surprisingly found that when hydrosilylating the silyl hydride and the allyl (alkyl)acrylate using the rhodium catalyst described herein, a beta hydride elimination occurs releasing propene and forming a product comprising an Si—O—C bond (i.e., the silyl ester compound, branched isomer) in greater than 99% selectivity. Without wishing to be bound by theory, the inventors thought this reaction is independent of the rhodium source, whereas other metal sources (such as platinum) produce a mix (with poor selectivity).

(D) Silyl Ester Compound

The product of step 1) of the method described herein is (D) a silyl ester compound, which has, per molecule, at least one silicon bonded group of formula:

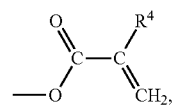

where R⁴ is as described above. For example, when starting material (A) is an organohydrogensiloxane oligomer (A1), the silyl ester compound may comprise unit formula (D1): $(R^1_3SiO_{1/2})_a(R^1_2R^{11}SiO_{1/2})_b(R^1_2SiO_{2/2})_c(R^1R^{11}SiO_{2/2})_d$, where $R^1$ and subscripts a, b, c, and d are as described above, and $R^{11}$ is the group of formula:

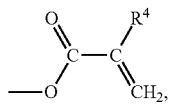

where $R^4$ is as described above. When starting material (A) is the organohydrogensiloxane oligomer of formula (A4) described above, then (D) the silyl ester compound has formula (D2):

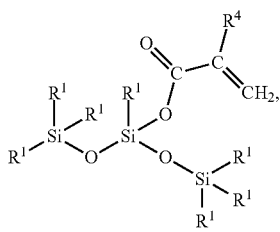

where $R^1$ and $R^4$ are as described above.

Alternatively, when starting material (A) is a silane monomer of formula (A5), described above, the silyl ester compound may comprise formula (D3): $R^{11}SiR^1_3$, where $R^{11}$ and $R^1$ are as described above.

Method for Preparing the Silyl Ester Protected Product

The silyl ester compound prepared in step 1) may be used as follows. The method described above, comprising step 1), may further comprise: 2) combining starting materials comprising: (D) the silyl ester compound described above and (E) an organosilicon compound having at least one silicon bonded hydrogen atom per molecule. Step 2) may optionally further comprise adding (F) a hydrosilylation reaction catalyst. The (F) hydrosilylation reaction catalyst may be an additional amount of the (C) rhodium catalyst used in step 1). Alternatively, (F) the hydrosilylation reaction catalyst added in step 2) may differ from (C) the rhodium catalyst used in step 1). In step 2), a hydrosilylation reaction of the silicon bonded hydrogen atom of starting material (E) and the unsaturated moiety of starting material (D) (shown above in the formula for group $R^{11}$) forms (G) a silyl ester protected product.

In step 2), the starting materials comprising (D) and (E), (and when present (F)) may be combined by any convenient means such as mixing. The starting materials may be combined in any order, however, without wishing to be bound by theory, it is thought that in order to control reaction rate, starting materials comprising (E) the organosilicon compound having at least one silicon bonded hydrogen atom per molecule may be in a reactor, and starting materials comprising (D), the silyl ester compound, may be added thereto in a manner to control exotherm of the hydrosilylation reaction, e.g., by metering over time or in aliquots after spaced time intervals. When starting material (F) the hydrosilylation reaction catalyst is used, it may be combined with (D) the silyl ester compound in the reactor before adding starting material (D) as described above. Without wishing to be bound by theory, when (D) the silyl ester compound is not purified after step 1), then starting material (D) in step 2) is in a mixture with residual amounts of (C) the rhodium catalyst, and this rhodium catalyst may catalyze hydrosilylation reaction of the alkenyl moiety of starting material (D) and the silicon bonded hydrogen atoms of starting material (E), either with or without (F) the hydrosilylation reaction catalyst, which differs from (C), the rhodium catalyst used in step 1).

Step 2) may be performed in the same reactor as step 1). Alternatively, step 2) may be performed in a different reactor. Without wishing to be bound by theory, it is thought that the present method can provide the benefit that purification of the silyl ester compound is not required before step 2). The silyl ester compound prepared in the reactor during step 1) may be left in the reactor and used in step 2) without further purification. For example, step 2) may be performed without removing (C) the rhodium catalyst and any unreacted (B) allyl (alkyl)acrylate. However, without wishing to be bound by theory, it is thought that too much excess of one reactant may result in the formation of undesirable side products, therefore, to minimize or eliminate the formation of side products, step 1) may be performed with a molar ratio of 1.01:1 to 1:1 for amounts of (B):(A), respectively, or excess (B) allyl (alkyl)methacrylate may be removed before step 2).

The temperature in step 2) is not critical. Step 2) may be performed at RT. Alternatively, step 2) may be performed at a temperature up to 200° C. Step 2) may be performed under inert conditions as described above for step 1).

(E) Organosilicon Compound Having at Least One SiH Per Molecule

Starting material (E) used in step 2) of the method described herein is an organosilicon compound having at least one silicon bonded hydrogen atom per molecule. The organosilicon compound (E) may be linear, branched, cyclic, resinous, or a combination thereof. Starting material (e) may be a polyorganohydrogensiloxane comprising siloxane units including, but not limited to, $HR^{15}_2SiO_{1/2}$, $R^{15}_3SiO_{1/2}$, $HR^{15}SiO_{2/2}$, $R^{15}_2SiO_{2/2}$, $R^{15}SiO_{3/2}$, $HSiO_{3/2}$ and $SiO_{4/2}$ units. In the preceding formulae, each $R^{15}$ is independently selected from the group consisting of monovalent hydrocarbon groups that are free of aliphatic unsaturation and monovalent halogenated hydrocarbon groups that are free of aliphatic unsaturation. Monovalent hydrocarbon groups that are free of aliphatic unsaturation are exemplified by alkyl groups and aryl groups. The alkyl groups are exemplified by, but not limited to, methyl, ethyl, propyl (e.g., iso-propyl and/or n-propyl), butyl (e.g., isobutyl, n-butyl, tert-butyl, and/or sec-butyl), pentyl (e.g., isopentyl, neopentyl, and/or tert-pentyl), cyclopentyl, cyclohexyl hexyl, heptyl, octyl, nonyl, and decyl, as well as branched saturated monovalent hydrocarbon groups of 6 or more carbon atoms. The aryl groups are exemplified by, but not limited to, cyclopentadienyl, phenyl, tolyl, xylyl, benzyl, phenyl ethyl, phenyl propyl, phenyl butyl, anthracenyl, and naphthyl. Suitable monovalent halogenated hydrocarbon groups for R15 are those monovalent hydrocarbon groups where one or more hydrogen atoms bonded to a carbon atom have been formally replaced with a halogen atom. Halogenated hydrocarbon groups include haloalkyl groups and haloaryl groups. Haloalkyl groups include fluorinated alkyl groups such as trifluoromethyl ($CF_3$), fluoromethyl, trifluoroethyl, 2-fluoropropyl, 3,3,3-trifluoropropyl, 4,4,4-trifluorobutyl, 4,4,4,3,3-pentafluorobutyl, 5,5,5,4,4,3,3-heptafluoropentyl, 6,6,6,5,5,4,4,3,3-nonafluorohexyl, 8,8,8,7,7-pentafluorooctyl, 2,2-difluorocyclopropyl, 2,3- difluorocyclobutyl, 3,4-difluorocyclohexyl, and 3,4-difluoro-5-methylcycloheptyl; and chlorinated alkyl groups such as chloromethyl, 3-chloropropyl, 2,2-dichlorocyclopropyl, 2,3-dichlorocyclopentyl. Alternatively, the alkyl and aryl groups for $R^{15}$ may be as described above for $R^1$.

Methods of preparing linear, branched, and cyclic organohydrogenpolysiloxanes suitable for use herein, such as hydrolysis and condensation of organohalosilanes, are well known in the art. Methods of preparing organohydrogenpolysiloxane resins suitable for use herein are also well known as exemplified in U.S. Pat. Nos. 5,310,843; 4,370,358; and 4,707,531.

Alternatively, starting material (E) may comprise a polydiorganohydrogensiloxane of unit formula (E1): $(R^{12}_2HSiO_{1/2})_k(R^{12}_2SiO_{2/2})_i(R^{12}HSiO_{2/2})_j(R^{12}_3SiO_{1/2})_{(2-k)}$, where subscript i has an average value ranging from 0 to 1000; subscript j has an average value ranging from 0 to 1000; subscript k is 0, 1, or 2; and a quantity (k+j)≥1. Each $R^{12}$ is independently selected from the group consisting of an alkyl group, an aryl group, a halogenated alkyl group, and a halogenated aryl group, which are as described above for $R^1$.

Examples of polyorganohydrogensiloxanes for starting material (E) include a polydiorganohydrogensiloxane of formula (E2):

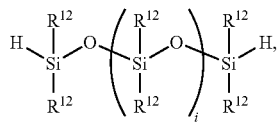

where $R^{12}$ and subscript i are as described above. Alternatively, subscript i may be 0 to 150, alternatively 50 to 150, alternatively 75 to 125, and alternatively 100.

Polyorganohydrogensiloxanes for starting material (E) are exemplified by:
a) α,ω-dimethylhydrogensiloxy-terminated polydimethylsiloxane,
b) α,ω-dimethylhydrogensiloxy-terminated poly(dimethylsiloxane/methylhydrogensiloxane),
c) α,ω-dimethylhydrogensiloxy-terminated polymethylhydrogensiloxane,
d) α,ω-trimethylsiloxy-terminated poly(dimethylsiloxane/methylhydrogensiloxane),
e) α,ω-trimethylsiloxy-terminated polymethylhydrogensiloxane,
f) α-dimethylhydrogensiloxy-,ω-trimethylsiloxy-terminated polydimethylsiloxane,
g) α-dimethylhydrogensiloxy-,ω-trimethylsiloxy-terminated poly(dimethylsiloxane/methylhydrogensiloxane),
h) α-dimethylhydrogensiloxy-,ω-trimethylsiloxy-terminated polymethylhydrogensiloxane,
i) a resin consisting essentially of $H(CH_3)_2SiO_{1/2}$ units and $SiO_{4/2}$ units, and
j) a combination of two or more thereof.

Starting material (E), the organosilicon compound having at least one silicon bonded hydrogen atom per molecule, and starting material (D), the silyl ester compound, are used in step 2) of the method in relative molar amounts of starting material (D): silicon bonded hydrogen atoms in starting material (E) greater than or equal to 1, i.e., molar ratio of (D):(SiH in E)≥1:1. Alternatively, (D):(SiH in E) may range from 5:1 to 1:1, alternatively 2:1 to 1:1; alternatively 1.8:1 to 1:1, and alternatively 1.1:1 to 1:1. Without wishing to be bound by theory, it is thought that a molar excess of starting material (D) relative to silicon bonded hydrogen atoms in starting material (E) may minimize unreacted SiH.

(F) Hydrosilylation Reaction Catalyst

Starting material (F) is optional and is a hydrosilylation reaction catalyst. Hydrosilylation reaction catalysts suitable for use in step 2) of the method described herein are known in the art and are commercially available. Starting material (F) can be a metal selected from the group consisting of platinum (Pt), rhodium (Rh), ruthenium (Ru), palladium (Pd), and iridium (Ir). Alternatively, (F) the hydrosilylation reaction catalyst may comprise Pt metal. Alternatively, (F) the hydrosilylation reaction catalyst may comprise a compound of the metal described above, for example, chloroplatinic acid (Speier's Catalyst), chloroplatinic acid hexahydrate, platinum dichloride, chloridotris(triphenylphosphane)rhodium(I) (Wilkinson's Catalyst), and combinations thereof. Alternatively, (F) the hydrosilylation reaction catalyst may comprise a complex of a compound (described above) with alkenyl-functional organopolysiloxanes, such as [1,3-Bis(2,6-diisopropylphenyl)imidazol-2-ylidene][1,3-divinyl-1,1,3,3-tetramethyldisiloxane]platinum(0). Alternatively, (F) the hydrosilylation reaction catalyst may comprise the compound, and/or the complex, microencapsulated in a matrix or coreshell type structure. Complexes of platinum with alkenyl-functional organopolysiloxanes include 1,3-diethenyl-1,1,3,3-tetramethyldisiloxane complexes with platinum (Karstedt's Catalyst). These complexes may be microencapsulated in a resin matrix. Alternatively, the hydrosilylation reaction catalyst may comprise 1,3-diethenyl-1,1,3,3-tetramethyldisiloxane complex with platinum. Exemplary hydrosilylation reaction catalysts are described in U.S. Pat. Nos. 3,159,601; 3,220,972; 3,296,291; 3,419,593; 3,516,946; 3,814,730; 3,989,668; 4,784,879; 5,036,117; and 5,175,325; and EP 0 347 895 B. Microencapsulated hydrosilylation reaction catalysts and methods of preparing them are known in the art, as exemplified in U.S. Pat. Nos. 4,766,176 and 5,017,654. Platinum hydrosilylation reaction catalysts are commercially available, for example, SYL-OFF™ 4000 Catalyst and SYL-OFF™ 2700 are available from Dow Silicones Corporation of Midland, Michigan, USA.

The amount of (F) the hydrosilylation reaction catalyst may be sufficient to provide at least 0.1 ppm of Pt metal based on combined weights of starting materials comprising (D), (E), and (F) used in step 2). Alternatively, the amount of starting material (F) may be sufficient to provide at least 0.1 ppm of Pt metal, alternatively at least 1 ppm of Pt metal, alternatively at least 2 ppm of Pt metal, alternatively at least 3 ppm of Pt metal, and alternatively at least 10 ppm of Pt metal, on the same basis. At the same time, the amount of starting material (F) may be sufficient to provide up to 1000 ppm of Pt metal, alternatively up to 750 ppm, alternatively up to 600 ppm, alternatively up to 500 ppm, alternatively up to 250 ppm, and alternatively up to 100 ppm based on combined weights of starting materials (D), (E), and (F).

(G) Silyl Ester Protected Product

In the method described herein, step 2) produces (G) a silyl ester protected product comprising a silyl ester moiety which is linked to an organosilicon moiety through a divalent hydrocarbon moiety. For example, (G) the silyl ester protected product has, per molecule, at least one moiety of formula (G1):

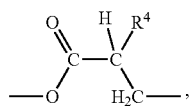

where $R^4$ is as described above. For example, when starting material (D) has formula (D2) described above, and starting material (E) has formula (E2), described above, then the silyl ester protected product formed in step 2) will have formula (G2):

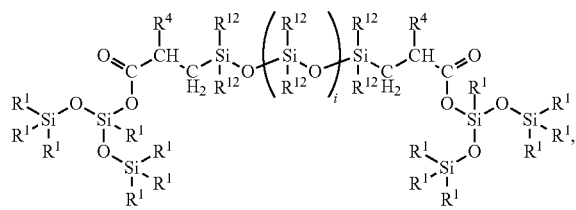

where $R^1$, $R^4$, $R^{12}$, and subscript i are as described above.

Method for Forming the Carboxy-Functional Organosilicon Compound

The method described above, which comprises steps 1) and 2), may further comprise: 3) combining starting materials comprising (G) the silyl ester protected product formed in step 2) and (H) water or an alcohol such as methanol or ethanol, thereby forming the carboxy-functional organosilicon compound. In step 3), (G) the silyl ester protected product formed in step 2) is deprotected (desilylated), thereby releasing the carboxy-functional organosilicon compound and a side product comprising a hydroxyl-functional silane monomer and/or siloxane oligomer. Step 3) may be performed by any convenient means, such as mixing. The same reactor used in step 1) and/or step 2) described above may be used. For example, after step 2), the water and/or alcohol may be added to the reactor. Temperature is not critical and may be −20° C. to 150° C. Step 3) may be performed under inert conditions, as described above for step 1). An acid may optionally be added during step 3). For example, para-toluene sulfonic acid may be added to facilitate deprotection in step 3). A solvent, such as tetrahydrofuran, may also optionally be added during step 3). Suitable conditions for step 3) may be as described in U.S. Pat. No. 7,307,178 to Kiyomori, et al. at col. 10, lines 18 to 41.

The method may optionally further comprise: 4) recovering the carboxy-functional organosilicon compound formed in step 3). Step 4) may be performed by any convenient means such as stripping, distillation, and/or extraction. The method may optionally further comprise: 5) recovering one or both of (C) the rhodium catalyst, (F) the hydrosilylation reaction catalyst (when used). However, without wishing to be bound by theory, it is thought that step 5) is not required, and may be eliminated, particularly when low levels of (C) the rhodium catalyst and/or (F) the hydrosilylation reaction catalyst are used in the method (e.g., when catalyst levels are 15 ppm or less, alternatively 10 ppm or less, of the metal).

Carboxy-Functional Organosilicon Compound

The method described above produces the carboxy-functional organosilicon compound having, per molecule, at least one silicon bonded group of formula

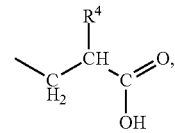

where $R^4$ is as described above. Alternatively, the carboxy-functional organosilicon compound may be a polyorganosiloxane, such as a polydiorganosiloxane. For example, when the silyl ester protected product of formula (G2) is used in step 3) of the method, the resulting carboxy-functional organosilicon compound may have formula:

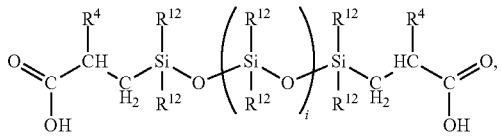

where $R^1$, $R^4$, $R^{12}$, and subscript i are as described above.

Examples

These examples are provided to illustrate the invention to one of ordinary skill in the art and are not to be construed as limiting the scope of the invention set forth in the claims. The starting materials used in the examples are described below in Table 1.

TABLE 1

| Starting Materials | | |
| --- | --- | --- |
| Starting Material | Chemical Name or Formula | Source |
| AMA or ALMA | Allyl methacrylate | Sigma |
| BHT | Butylated hydroxytoluene | Sigma |
| HMTS | 1,1,1,3,5,5,5-heptamethyltrisiloxane | Dow Silicones Corporation |
| TMDS | 1,1,3,3-tetramethyldisiloxane | Dow Silicones Corporation |
| triethoxysilane | triethoxysilane | Dow Silicones Corporation |

TABLE 1-continued

Starting Materials

| Starting Material | Chemical Name or Formula | Source |
|---|---|---|
| MA | Methacrylic acid | Sigma |
| Karstedt's catalyst | 1,3-diethenyl-1,1,3,3-tetramethyldisiloxane complexes with platinum | Dow Silicones Corporation |
| Pt(NHC)(dvtms) | [1,3-Bis(2,6-diisopropylphenyl)imidazol-2-ylidene][1,3-divinyl-1,1,3,3-tetramethyldisiloxane]platinum(0) | Umicore |
| [RhCODCl]2 | rhodium 1,5-cyclooctadiene chloride dimer | Umicore |
| [Rh(DPPE)Cl]2 | Bis[(diphenylphosphino)ethane]dichlorodirhodium | Strem |
| Toluene | toluene | Sigma |
| SiH terminated PDMS | α,ω-dimethylhydrogensiloxy-terminated polydimethylsiloxane with a DP of 100 | Dow Silicones Corporation |
| THF | tetrahydrofuran | Sigma |
| CDCl$_3$ | Deuterated chloroform | Sigma |

In this Working Example 1, 10 g of allyl methacrylate and 20 mg of BHT were added to a 250 mL 2 neck flask. To an addition funnel was added 17.6 g (1 molar eq.) of HMTS. The other port in the flask was plugged with a temperature probe, and then the reaction mixture was put under N2 while heating to 50° C. 100 μL of [Rh(COD)Cl]2 (0.025 M in toluene) was added, and then the HMTS addition started. After addition was complete the yield was >95% for the silyl ester. $^1$H NMR (CDCl$_3$, ppm) 6.09 (1H), 5.57 (1H), 1.91 (3H), 0.25 (3H), 0.1(18H). The NMR results confirmed that no linear isomer or propene hydrosilylation product formed under the conditions of this Working Example 1.

In this Working Example 2, 10 g of allyl methacrylate and 20 mg of BHT were added to a 250 mL 2 neck flask. To an addition funnel was added 9.22 g (1 molar eq.) of triethylsilane. The other port in the flask was plugged with a temperature probe, and then the reaction mixture was put under N2 while heating to 50° C. 10 μL of [Rh(COD)Cl]2 (0.025 M in toluene) was added, and then the triethylsilane addition started. The reaction was heated for 2.5 h to yield 80% of the silyl ester. $^1$H NMR (CDCl$_3$, ppm) 6.13 (1H), 5.59 (1H), 1.94 (3H), 1.01 (9H), 0.82(6H). The NMR results confirmed that no linear isomer or propene hydrosilylation product formed under the conditions of this Working Example 2.

In this Working Example 3, Working Example 1 was repeated, except that [Rh(DPPE)Cl]2 was used instead of [Rh(COD)Cl]2 as the catalyst. The reaction proceeded to >95% yield. The NMR results confirmed that no linear isomer or propene hydrosilylation reaction product formed under the conditions of this Working Example 2.

The reaction scheme in Working Examples 1 and 2 was thought to be:

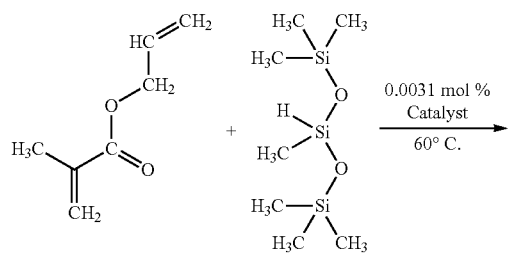

-continued

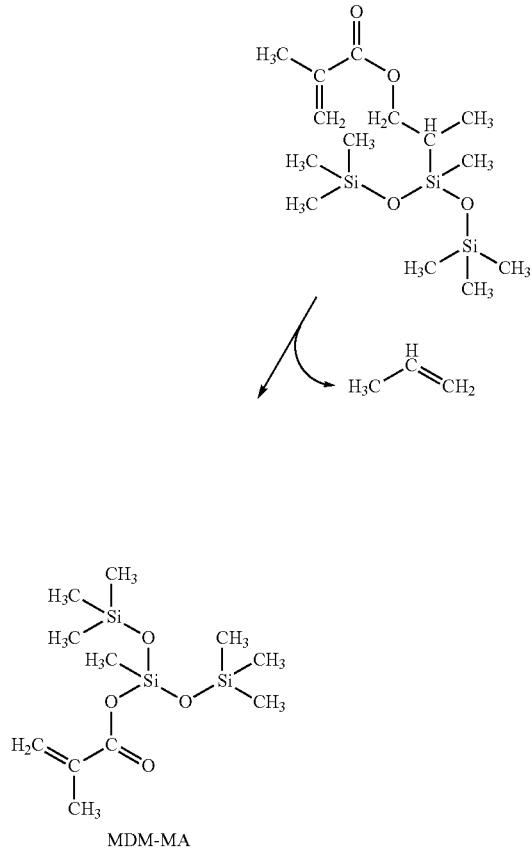

MDM-MA

In this Comparative Example 1, 30 g (1 eq.) of allyl methacrylate and 50 mg of BHT were added to a 2 neck flask. To an addition funnel was added 53 g (1 eq.) of HTMS. The flask contents were heated to 50° C. using a heating mantle, and then 20 μL of Karstedt's catalyst (2% in xylenes) was injected. The heating mantle was removed, and the reaction mixture was allowed to exotherm to 62° C. The temperature was maintained with air cooling until the addition of HMTS was complete. The $^1$H NMR spectrum was then measured. The heat was turned off, and the resulting reaction mixture was stirred overnight. Significant propene hydrosilylation also occurred.

TABLE 2

Reactions of Comparative Example 1 and Working Examples 1-3.

| Example | (B) Allyl (meth) acrylate (1 eq.) | (A) Silyl Hydride (1 eq.) | (C) Catalyst (mol %) | Ratio of Branched:linear isomers formed | Propene hydrosilylation by-product formed? | Other Side Products | Conversion to (D) silyl ester compound |
|---|---|---|---|---|---|---|---|
| 1 (comparative) | ALMA | HMTS | Karstedt's (0.00000394 mol %) | 38:62 | 10% | 8% | 31% |
| 1 (working) | ALMA | HMTS | [RhCODCl]2 (0.000031 mol %) | Branched | 0% | 5% | 95% |
| 2 (working) | ALMA | HSiEt$_3$ | RhCODCl]2 (0.0000031 mol %) | Branched | 0% | 20% | 80% |
| 3 (working) | ALMA | HMTS | [Rh(DPPE)Cl]2 (0.000031 mol %) | Branched | 0% | 5% | 95% |

Working examples 1, 2, and 3 showed that different rhodium catalysts prepared the desired branched isomer (the silyl ester compound) with good selectivity and yield, even when different silyl hydrides were used. Comparative example 1 showed that a platinum catalyst did not produce the desired selectivity and yield under the conditions tested. The catalyst in Working Example 3 is formed from the catalyst in Working Examples 1 and 2. With similar reactivity in Working Examples 1 and 3, it is believed that the ligands in these catalysts are inconsequential in forming the silyl ester compound with the choice of metal predominating the selectivity.

In this Comparative Example 2, Comparative Example 1 was repeated several times, except methacrylic acid instead of the allyl (alkyl)acrylate described herein, different silyl hydrides, different catalysts, and different temperatures were used, each with 2 h reaction times. Starting materials, reaction temperatures, results are shown below in Table 3.

TABLE 3

Reactions of Comparative Example 2

| Sample | (B) Substrate | (A) Silyl hydride | (C) Catalyst | (D) Silyl ester product | Temp. (° C.) | Catalyst Loading (mol %) | Side Products? | Unreacted Substrate |
|---|---|---|---|---|---|---|---|---|
| C2-1 | MA | TMDS | Karstedt's | <5% | 50 | 0.0021 | Major | Yes |
| C2-2 | MA | TMDS | Pt(NHC)(dvtms) | <5% | 50 | 0.0021 | Major | Yes |
| C2-3 | MA | TMDS | [RhCODCl]2 | <5% | 50 | 0.0021 | Major | Yes |
| C2-4 | MA | TMDS | Karstedt's | <5% | 65 | 0.021 | Major | Yes |
| C2-5 | MA | TMDS | Pt(NHC)(dvtms) | <5% | 65 | 0.021 | Major | Yes |
| C2-6 | MA | TMDS | [RhCODCl]2 | <5% | 65 | 0.021 | major | Yes |
| C2-7 | MA | Triethoxysilane | Karstedt's | 0 | 80 | 0.021 | Minor | Yes |
| C2-8 | MA | Triethoxysilane | Pt(NHC) | 0 | 80 | 0.021 | Minor | Yes |
| C2-9 | MA | Triethoxysilane | [RhCODCl]2 | 0 | 80 | 0.021 | Minor | Yes |

Table 3 shows that methacrylic acid (MA) cannot be directly hydrosilylated with a silyl hydride to produce a silyl ester compound (as in Working Examples 1 to 3) using the method described herein. Significant side reactions and/or poor yield was observed for each reaction with methacrylic acid.

In this Working Example 3, the protected silyl ester prepared as described above in Examples 1 and 2 (abbreviated MDM-MA in the reaction scheme shown above) was hydrosilylated, as follows. To a 250 mL 2 neck flask was added 10 g of SiH terminated PDMS. To an addition funnel was added 2.41 g of the MDM-MA (1.8 eq.). The other port of the flask was plugged with a temperature probe, and then the reaction mixture was put under N2 while heating to 50° C. Next, 10 μL of 2% Karstedt's catalyst (dissolved in 98% xylene) was added at 50° C., and then the addition of MDM-MA was started. A slight exotherm was observed during the addition with the temperature raising to a high of 60° C. After addition was complete, the heat was removed. An NMR sample was taken after addition. $^1$H NMR showed complete reaction of the olefinic group on MDM-MA, and $^{13}$C NMR indicated that the silyl ester moiety was still intact in the resulting protected product (175 ppm). The reaction scheme for this Working Example 3 was thought to be:

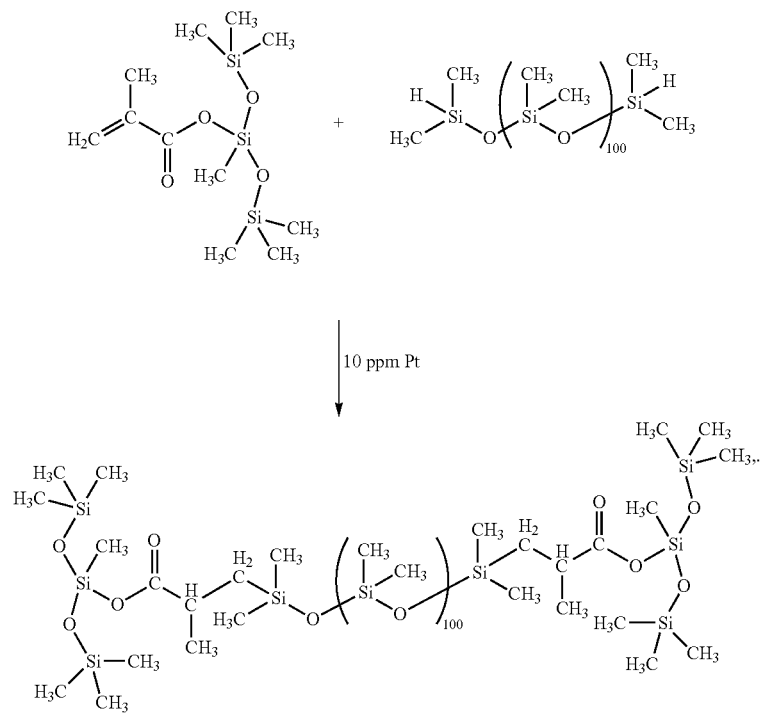
In this Working Example 4, the silyl ester protected product prepared in Working Example 3 was deprotected by heating at 50° C. in a 1:1 mixture of THF:siloxane and excess water for 16 h. $^{13}$C NMR showed a shift of silyl ester at 175 ppm to 183 ppm (COOH). The reaction scheme for this Working Example 4 was thought to be:
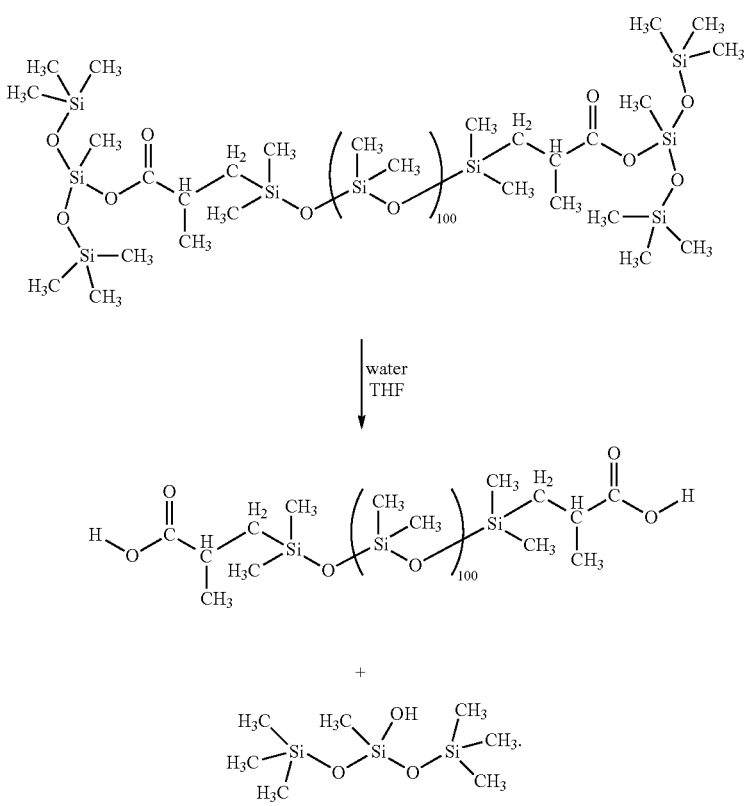

INDUSTRIAL APPLICABILITY

The present invention provides a new method for preparing (D) the silyl ester compound described above. The method may further comprise using the silyl ester compound to prepare a carboxy-functional organosilicon compound. The method provides a benefit over previous methods for preparing carboxy-functional organosilicon compounds in that steps 1), 2) and 3) can all be done in the same reactor. Furthermore, intermediate purification steps between step 1) and step 2) (e.g., to remove rhodium catalyst and/or unreacted allyl (alkyl)methacrylate); or between step 2) and step 3); are not required. Furthermore, with the low catalyst loadings effective in the method, a catalyst recovery step is not required.

This method provides the further benefit of minimizing the formation of side products. Without wishing to be bound by theory, it is thought that an alkene, such as propene, forms as a side product in step 1), as exemplified in the reaction scheme shown above for Working Examples 1 and 2. However, the propene is relatively easy to remove, and it is not hydrogenated (into a side product by reaction with the (A) silyl hydride, which detrimentally affects yield and stoichiometry of the method described herein) under the conditions employed in step 1) of the method described herein.

Definitions and Usage of Terms

The SUMMARY and ABSTRACT are hereby incorporated by reference. All amounts, ratios, and percentages are by weight unless otherwise indicated by the context of the specification. The articles 'a', 'an', and 'the' each refer to one or more, unless otherwise indicated by the context of the specification. The transitional phrases "comprising", "consisting essentially of", and "consisting of" are used as described in the Manual of Patent Examining Procedure Ninth Edition, Revision 08.2017, Last Revised January 2018 at section § 2111.03 I., II., and III. The abbreviations used herein have the definitions in Table 4.

TABLE 4

Abbreviations Used Herein

| Abbreviation | Definition |
|---|---|
| Allyl (alkyl)acrylate | General term including both the species: allyl acrylate and allyl alkyl acrylate |
| Allyl (meth)acrylate | General term for both the species: allyl acrylate and allyl methacrylate |
| BHT | Butylated hydroxytoluene, a preservative |
| Bu | butyl |
| ° C. | Degrees Celsius |
| COD | 1,5-cyclooctadiene |
| Et | ethyl |
| g | grams |
| h | hours |
| HMTS | 1,1,1,3,5,5,5-heptamethyltrisiloxane |
| M | Molar |
| Me | methyl |
| mg | milligrams |
| MHz | megaHertz |
| N | normal |
| NMR | Nuclear Magnetic Resonance |
| Ph | phenyl |
| ppm | parts per million |
| Pr | propyl |

TABLE 4-continued

Abbreviations Used Herein

| Abbreviation | Definition |
|---|---|
| [RhCODCl]2 | Rhodium 1,5-cyclooctadiene chloride dimer |
| [Rh(DPPE)Cl]2 | Rhodium (diphenylphosphinoethane)chloride dimer |
| μ | bridging |
| uL or μL | microliters |

Test Methods—
$^1$H NMR

Single pulse excitation was applied to observe 1H NMR response. Measurements were made with 1H NMR frequencies of 400 MHz or 600 MHz. Prepulse relaxation time (d1) exceeded 10 s. Post pulse observation (aq or at) exceeded 2 s. Data were acquired on Agilent MR400 or Bruker Avance III HD consoles. $^{13}$C NMR Single pulse excitation was applied to observe 1H NMR response. Measurements were made with 13C {1H} NMR frequencies of 125 MHz. Prepulse relaxation time (d1) was 3 s. Post pulse observation (aq or at) exceeded 2 s. Data were acquired on Agilent MR400 or Bruker Avance III HD consoles.

The invention has been described in an illustrative manner, and it is to be understood that the terminology which has been used is intended to be in the nature of words of description rather than of limitation. With respect to any Markush groups relied upon herein for describing particular features or aspects, different, special, and/or unexpected results may be obtained from each member of the respective Markush group independent from all other Markush members. Each member of a Markush group may be relied upon individually and or in combination and provides adequate support for specific embodiments within the scope of the appended claims.

Furthermore, any ranges and subranges relied upon in describing the present invention independently and collectively fall within the scope of the appended claims, and are understood to describe and contemplate all ranges including whole and/or fractional values therein, even if such values are not expressly written herein. One of skill in the art readily recognizes that the enumerated ranges and subranges sufficiently describe and enable various embodiments of the present invention, and such ranges and subranges may be further delineated into relevant halves, thirds, quarters, fifths, and so on. As just one example, a range of "50 to 80" may be further delineated into a lower third, i.e., 50 to 60, a middle third, i.e., 60 to 70, and an upper third, i.e., from 70 to 80, which individually and collectively are within the scope of the appended claims, and may be relied upon individually and/or collectively and provide adequate support for specific embodiments within the scope of the appended claims. In addition, with respect to the language which defines or modifies a range, such as "at least," "greater than," "less than," "no more than," and the like, it is to be understood that such language includes subranges and/or an upper or lower limit.

Embodiments of the Invention

In a first embodiment, a method for producing a silyl ester compound comprises:
    1) combining starting materials comprising
        (A) a silyl hydride functional silane monomer and/or a silyl hydride functional siloxane oligomer, (B) an allyl (alkyl)acrylate of formula

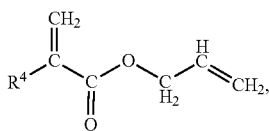

where $R^4$ is selected from the group consisting of hydrogen and an alkyl group of 1 to 8 carbon atoms; and (C) a rhodium catalyst in an amount sufficient to provide 0.0000001 mol % to 10 mol % of rhodium metal based on amount of starting material (A), the silyl hydride; thereby producing (D) the silyl ester compound.

In a second embodiment, in the method of the first embodiment, starting material (A) comprises an organohydrogensiloxane oligomer of unit formula (A1): $(R^1_3SiO_{1/2})_a(R^1_2HSiO_{1/2})_b(R^1_2SiO_{2/2})_c(R^1HSiO_{2/2})_d$, where each $R^1$ is independently selected from the group consisting of an alkyl group of 1 to 8 carbon atoms and a halogenated alkyl group of 1 to 8 carbon atoms; subscript a is 0 to 2, subscript b is 0 to 2, and a quantity (a+b)=2; subscript c≥0, subscript d≥0; a quantity (b+d)=1; and 4≥(a+b+c+d)≥2.

In a third embodiment, in the method of the second embodiment, subscript a=2, d=1, and b=c=0, starting material (A) is an organohydrogensiloxane oligomer of formula:

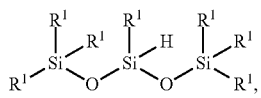

where $R^1$ is as described above.

In a fourth embodiment, in the method of the first embodiment, starting material (A) is selected from the group consisting of 1,1,1,3,5,5,5-heptamethyltrisiloxane; 1,1,3,3,3-pentamethyldisiloxane; and a combination thereof.

In a fifth embodiment, in the method of the first embodiment, starting material (A) comprises a silane of formula: $HSiR^1_3$, where each $R^1$ is independently selected from the group consisting of an alkyl group of 1 to 6 carbon atoms and a halogenated alkyl group of 1 to 6 carbon atoms.

In a sixth embodiment, in the method of the fifth embodiment, starting material (A) is selected from the group consisting of trimethylsilane, triethylsilane, tripropylsilane, tributylsilane, trihexylsilane, trioctylsilane, and a combination thereof.

In a seventh embodiment, in the method of the first embodiment, starting material (B) comprises allyl (meth)acrylate.

In an eighth embodiment, in the method of the first embodiment, starting material (C) comprises a rhodium diphosphine complex.

In a ninth embodiment, in the method of the eighth embodiment, the rhodium diphosphine complex has formula (C1): $\{[(R^8_2P)R^7(R^8_2P)]Rh(\mu-R^9)\}_2$, where each $R^7$ is an independently selected divalent hydrocarbon group, each $R^8$ is an independently selected monovalent hydrocarbon group, each $R^9$ is an independently selected negatively charged bridging ligand, and each $R^{10}$ is an independently selected anion.

In a tenth embodiment, in the method of the ninth embodiment, the rhodium diphosphine complex is selected from the group consisting of [1,2-bis(diphenylphosphino)ethane]dichlorodirhodium and [1,2-bis(diethylphospino)ethane]dichlorodirhodium, and a combination thereof.

In an eleventh embodiment, in the method of the first embodiment, starting material (C) comprises a rhodium complex free of phosphine ligands.

In a twelfth embodiment, in the method of the eleventh embodiment, starting material (C) is selected from the group consisting of (C3): $[R^5_hRh]R^{10}$, (C4): $[Rh(R^5)_h(u-R^9)_f]_g$, or (C5) a combination of both (C3) and (C4), where subscript h is 1-4, each $R^5$ is independently selected from the group consisting of a 1,5-cyclooctadiene ligand, a 2,5-norbornadiene ligand, an ethylene ligand, a cyclooctene ligand, and an acetylacetonate ligand; $R^{10}$ is an anion; $R^9$ is a negatively charged bridging ligand; subscript f is 1 or 2, each $R^6$ is a ligand that can be activated off the complex, and subscript g is 1 or 2.

In a thirteenth embodiment, in the method of the twelfth embodiment, starting material (C) comprises rhodium 1,5-cyclooctadiene chloride dimer.

In a fourteenth embodiment, in the method of the first embodiment, where combining starting materials in step 1) comprises heating at a temperature of 50° C. to 60° C. and mixing the starting materials.

In a fifteenth embodiment, the method of the first embodiment produces a silyl ester compound that has, per molecule, at least one silicon bonded group of formula:

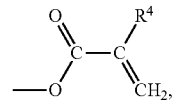

where $R^4$ is as described above.

In a sixteenth embodiment, in the method of the fifteenth embodiment, the silyl ester compound comprises unit formula (D1): $(R^1_3SiO_{1/2})_a(R^1_2R^{11}SiO_{1/2})_b(R^1_2SiO_{2/2})_c(R^1R^{11}SiO_{2/2})_d$, where each $R^1$ is independently selected from the group consisting of an alkyl group of 1 to 6 carbon atoms and a halogenated alkyl group of 1 to 6 carbon atoms; subscript a is 0 to 2, subscript b is 0 to 2, and a quantity (a+b)=2; subscript c≥0, subscript d≥0; a quantity (b+d)=1; and 4≥(a+b+c+d)≥2, and $R^{11}$ is the group of formula:

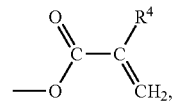

where $R^4$ is as described above.

In a seventeenth embodiment, in the method of the sixteenth embodiment, the silyl ester compound prepared has formula (D2):

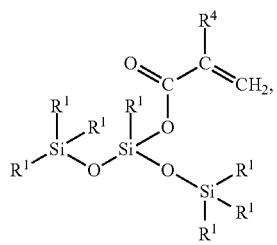

where $R^1$ and $R^4$ are as described above.

In an eighteenth embodiment, in the method of the fifteenth embodiment, the silyl ester compound prepared comprises formula (D3): $R^{11}SiR^1_3$, where each $R^1$ is independently selected from the group consisting of an alkyl group of 1 to 6 carbon atoms and $R^{11}$ is the group of formula

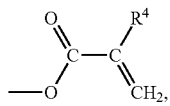

where $R^4$ is as described above.

In a nineteenth embodiment, a method for producing a silyl ester protected product comprises:

1) combining starting materials comprising
   (A) a silyl hydride functional silane monomer and/or a silyl hydride functional siloxane oligomer,
   (B) an allyl (alkyl)acrylate of formula

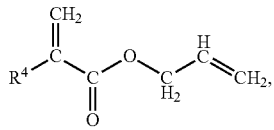

where $R^4$ is selected from the group consisting of hydrogen and an alkyl group of 1 to 6 carbon atoms; and
   (C) a rhodium catalyst in an amount of 0.0000001 mol % to 10 mol % based on weight of starting material (A), the silyl hydride; thereby producing (D) a silyl ester compound; and 2) combining starting materials comprising
   (D) the silyl ester compound formed in step 1),
   (E) an organosilicon compound having at least one silicon bonded hydrogen atom per molecule, and
   optionally, (F) a hydrosilylation reaction catalyst in amount to provide 0 to 1,000 ppm of metal, thereby producing (G) the silyl ester protected product.

In a twentieth embodiment, in the method of the nineteenth embodiment, (D) the silyl ester compound has, per molecule, at least one silicon bonded group of formula:

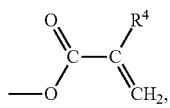

where $R^4$ is selected from the group consisting of hydrogen and an alkyl group of 1 to 6 carbon atoms.

In a twenty-first embodiment, in the method of the twentieth embodiment, the silyl ester compound comprises unit formula (D1): $(R^1_3SiO_{1/2})_a(R^1_2R^{11}SiO_{1/2})_b(R^1_2SiO_{2/2})_c(R^1R^{11}SiO_{2/2})_d$, where each $R^1$ is independently selected from the group consisting of an alkyl group of 1 to 8 carbon atoms and a halogenated alkyl group of 1 to 8 carbon atoms; subscript a is 0 to 2, subscript b is 0 to 2, and a quantity (a+b)=2; subscript c≥0, subscript d≥0; a quantity (b+d)=1; and 4≥(a+b+c+d)≥2, and $R^{11}$ is the group of formula:

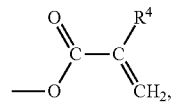

where $R^4$ is as described above.

In a twenty-second embodiment, in the method of the twenty-first embodiment, the silyl ester compound has formula

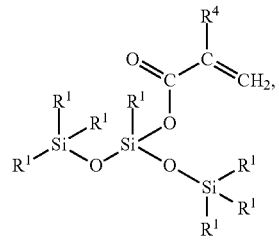

where $R^1$ and $R^4$ are as described above.

In a twenty-third embodiment, in the method of the twentieth embodiment, the silyl ester compound of the comprises formula: $R^{11}SiR^1_3$, where each $R^1$ is independently selected from the group consisting of an alkyl group of 1 to 6 carbon atoms and a halogenated alkyl group of 1 to 6 carbon atom, and $R^{11}$ is the group of formula:

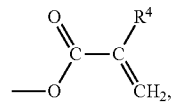

where $R^4$ is as described above.
are as described above

In a twenty-fourth embodiment, a method for preparing a carboxy-functional organosilicon compound comprises:

1) combining starting materials comprising
   (A) a silyl hydride functional silane monomer and/or a silyl hydride functional siloxane oligomer,
   (B) an allyl (alkyl)acrylate of formula

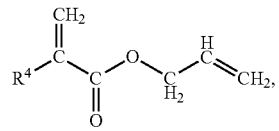

where $R^4$ is selected from the group consisting of hydrogen and an alkyl group of 1 to 8 carbon atoms; and
   (C) a rhodium catalyst in an amount of 0.000001 to 10 mol % based on amount of starting material (A), the silyl hydride; thereby producing (D) a silyl ester compound;

2) combining starting materials comprising
   (D) the silyl ester compound formed in step 1),
   (E) an organosilicon compound having at least one silicon bonded hydrogen atom per molecule, and
   optionally (F) a hydrosilylation reaction catalyst in amount to provide 0 to 1,000 ppm of metal, thereby producing (G) a silyl ester protected product; and 3) combining starting materials comprising (G) the silyl ester protected product formed in step 2) and (H) water and/or an alcohol, thereby producing the carboxy-functional organosilicon compound.

In a twenty-fifth embodiment, in the method of the twenty-fourth embodiment, (D) the silyl ester compound has, per molecule, at least one silicon bonded group of formula:

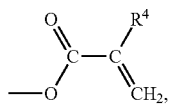

where $R^4$ is as described above.

In a twenty-sixth embodiment, in the method of the twenty-fifth embodiment, the silyl ester compound comprises unit formula (D1): $(R^1_3SiO_{1/2})_a(R^1_2R^{11}SiO_{1/2})_b(R^1_2SiO_{2/2})_c(R^1R^{11}SiO_{2/2})_d$, where each $R^1$ is independently selected from the group consisting of an alkyl group of 1 to 6 carbon atoms and a halogenated alkyl group of 1 to 6 carbon atoms; subscript a is 0 to 2, subscript b is 0 to 2, and a quantity (a+b)=2; subscript c≥0, subscript d≥0; a quantity (b+d)=1; and 4≥(a+b+c+d)≥2, and $R^{11}$ is the group of formula:

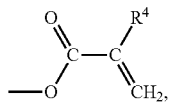

where $R^4$ is as described above.

In a twenty-seventh embodiment, in the method of the twenty-sixth embodiment, the silyl ester compound has formula

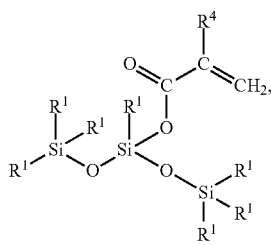

where $R^1$ and $R^4$ are as described above.

In a twenty-eighth embodiment, in the method of the twenty-fourth embodiment, the silyl ester compound of the comprises formula (D3): $R^{11}SiR^1_3$, where each $R^1$ is independently selected from the group consisting of an alkyl group of 1 to 6 carbon atoms and a halogenated alkyl group of 1 to 6 carbon atoms; and $R^{11}$ is a group of formula:

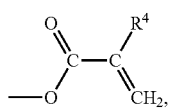

where $R^4$ is as described above.

In a twenty-ninth embodiment, the method of the twenty-fourth embodiment further comprises: 4) recovering the carboxy-functional organosilicon compound formed in step 3).

The invention claimed is:
1. A method comprising:
1) combining starting materials comprising
   (A) a silyl hydride functional silane monomer and/or a silyl hydride functional siloxane oligomer,
   (B) an allyl (alkyl) acrylate of formula

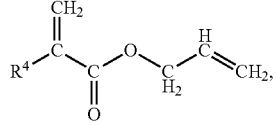

where $R^4$ is selected from the group consisting of hydrogen and an alkyl group of 1 to 8 carbon atoms; and
   (C) a rhodium catalyst in an amount of 0.0000001 mol % to 10 mol % based on amount of starting material (A); thereby producing (D) a silyl ester compound; and
2) combining starting materials comprising
   (D) the silyl ester compound formed in step 1),
   (E) an organosilicon compound having at least one silicon bonded hydrogen atom per molecule, and
   optionally (F) a hydrosilylation reaction catalyst in amount to provide 0 to 1,000 ppm of metal, thereby producing (G) a silyl ester protected product.

2. The method of claim 1, where starting material (A) comprises an organohydrogensiloxane oligomer of unit formula (A1):
$(R^1_3SiO_{1/2})_a(R^1_2HSiO_{1/2})_b(R^1_2SiO_{2/2})_c(R^1HSiO_{2/2})_d$,
where each $R^1$ is independently selected from the group consisting of an alkyl group of 1 to 6 carbon atoms and a halogenated alkyl group of 1 to 6 carbon atoms; subscript a is 0 to 2, subscript b is 0 to 2, and a quantity (a+b)=2; subscript c≥0, subscript d≥0; a quantity (b+d)= 1; and 4≥(a+b+c+d)≥2.

3. The method of claim 1, where starting material (A) comprises a silane of formula: $HSiR^1_3$, where each $R^1$ is independently selected from the group consisting of an alkyl group of 1 to 8 carbon atoms and a halogenated alkyl group of 1 to 6 carbon atoms.

4. The method of claim 1, where starting material (B) comprises allyl (meth)acrylate.

5. The method of claim 1, where starting material (C) comprises a rhodium diphosphine catalyst of formula $\{[(R^8_2P)R^7(R^8_2P)]Rh(\mu-R^9)\}_2$; where each $R^7$ is an independently selected divalent hydrocarbon group, each $R^8$ is an independently selected monovalent hydrocarbon group, with the proviso that two instances of $R^8$ may combine to form a heterocyclic group including P, and each $\mu-R^9$ is an independently selected negatively charged bridging ligand.

6. The method of claim 1, where starting material (C) comprises a rhodium catalyst with a formula selected from the group consisting of (C3) $[Rh(R^5)_h(\mu-R^9)]_2$, (C4) $[R^5_hRh]R^{10}$, and (C5) combination of both (C3) and (C4), where subscript h is 1-4, each $R^5$ is independently selected from the group consisting of a 1,5-cyclooctadiene ligand, a 2,5-norbornadiene ligand, an ethylene ligand, a cyclooctene ligand, and a acetylacetonate ligand, $R^{10}$ is an anion, and $\mu-R^9$ is a negatively charged bridging ligand.

7. The method of claim 1, where combining in step 1) comprises heating at a temperature of 50° C. to 60° C. and mixing the starting materials.

8. The method of claim 1, where (F) the hydrosilylation reaction catalyst is used.

9. The method of claim 1, further comprising: 3) combining starting materials comprising (G) the silyl ester protected product formed in step 2) and (H) water and/or an alcohol, thereby producing a carboxy-functional organosilicon compound.

10. The method of claim 9, further comprising: 4) recovering the carboxy-functional organosilicon compound formed in step 3).

* * * * *